United States Patent [19] [11] 4,100,572
Perisic [45] Jul. 11, 1978

[54] OPTICAL METHOD AND APPARATUS FOR CARRYING OUT THE METHOD

[76] Inventor: Zoran Perisic, "Gwynfenton",, White Well, St. Teath, Nr. Bodmin, Cornwall, England

[21] Appl. No.: 732,603
[22] Filed: Oct. 15, 1976
[30] Foreign Application Priority Data
Oct. 17, 1975 [GB] United Kingdom ............... 42788/75
[51] Int. Cl.² ............................................. H04N 7/18
[52] U.S. Cl. ..................................................... 358/93
[58] Field of Search ................................. 358/93, 104

[56] References Cited
U.S. PATENT DOCUMENTS
3,420,953   1/1969   Wolff ..................................... 358/93

Primary Examiner—Richard Murray
Attorney, Agent, or Firm—Schuyler, Birch, Swindler, McKie and Beckett

[57] ABSTRACT

This invention relates to an improved optical method which gives apparent movement in depth to motionless or unsupported subjects and to an apparatus for carrying out the method.

17 Claims, 9 Drawing Figures

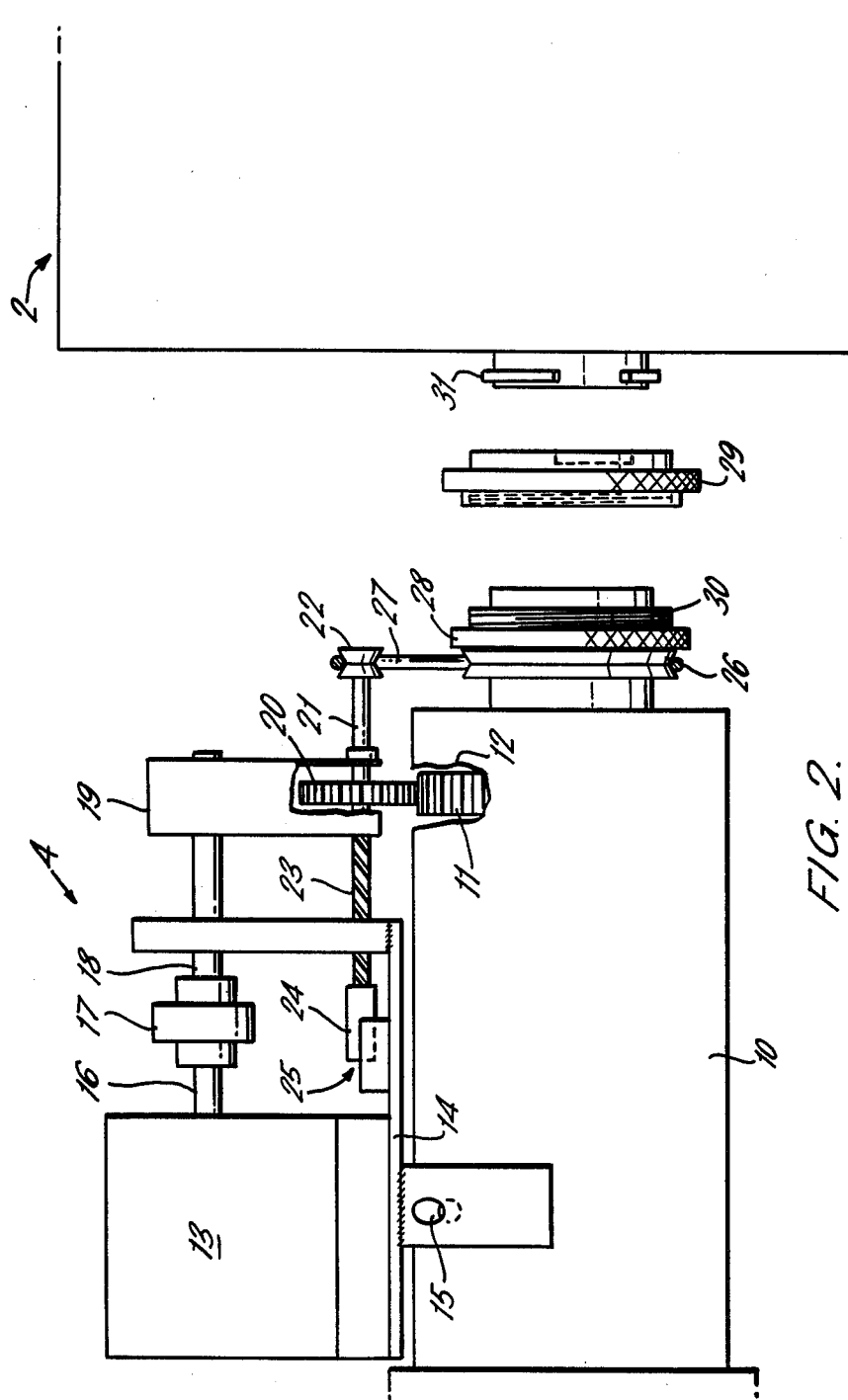

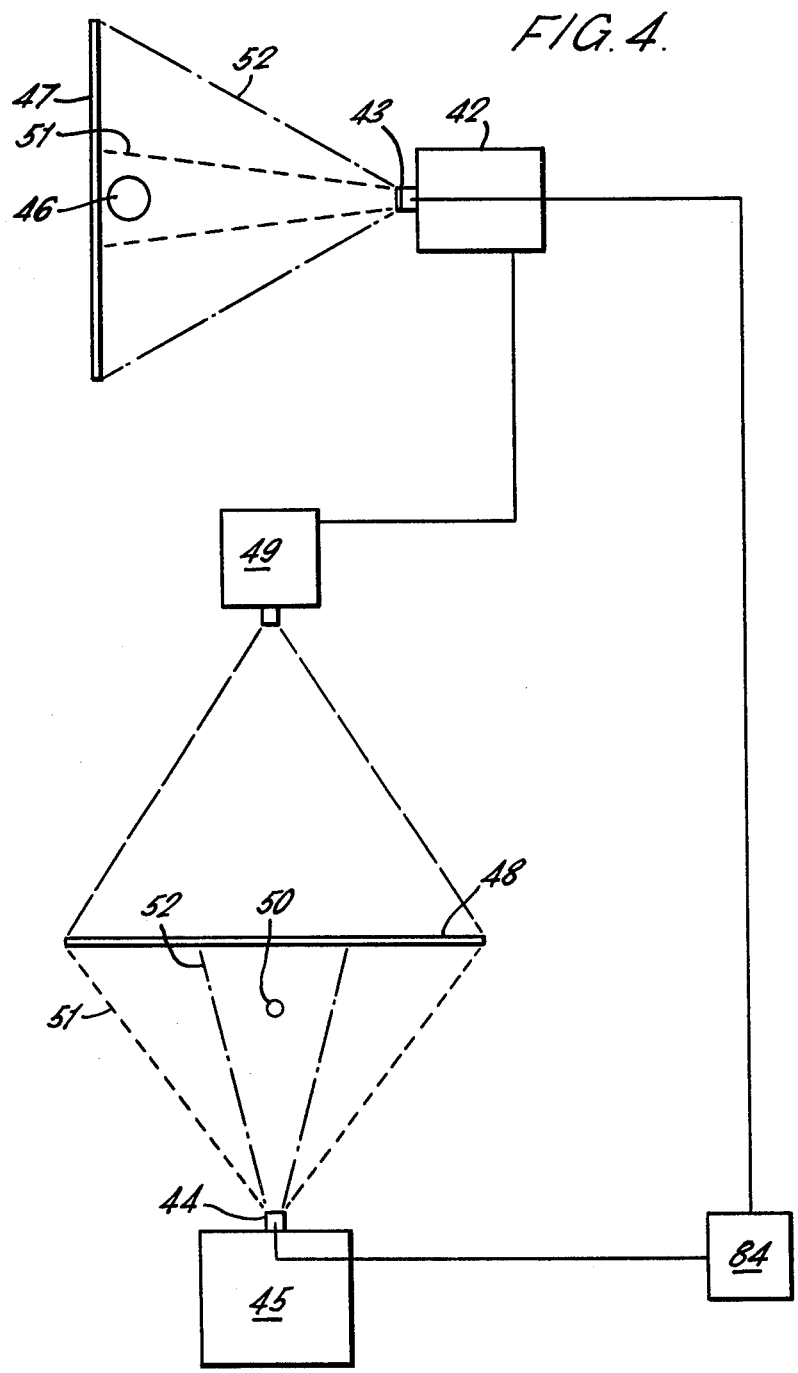

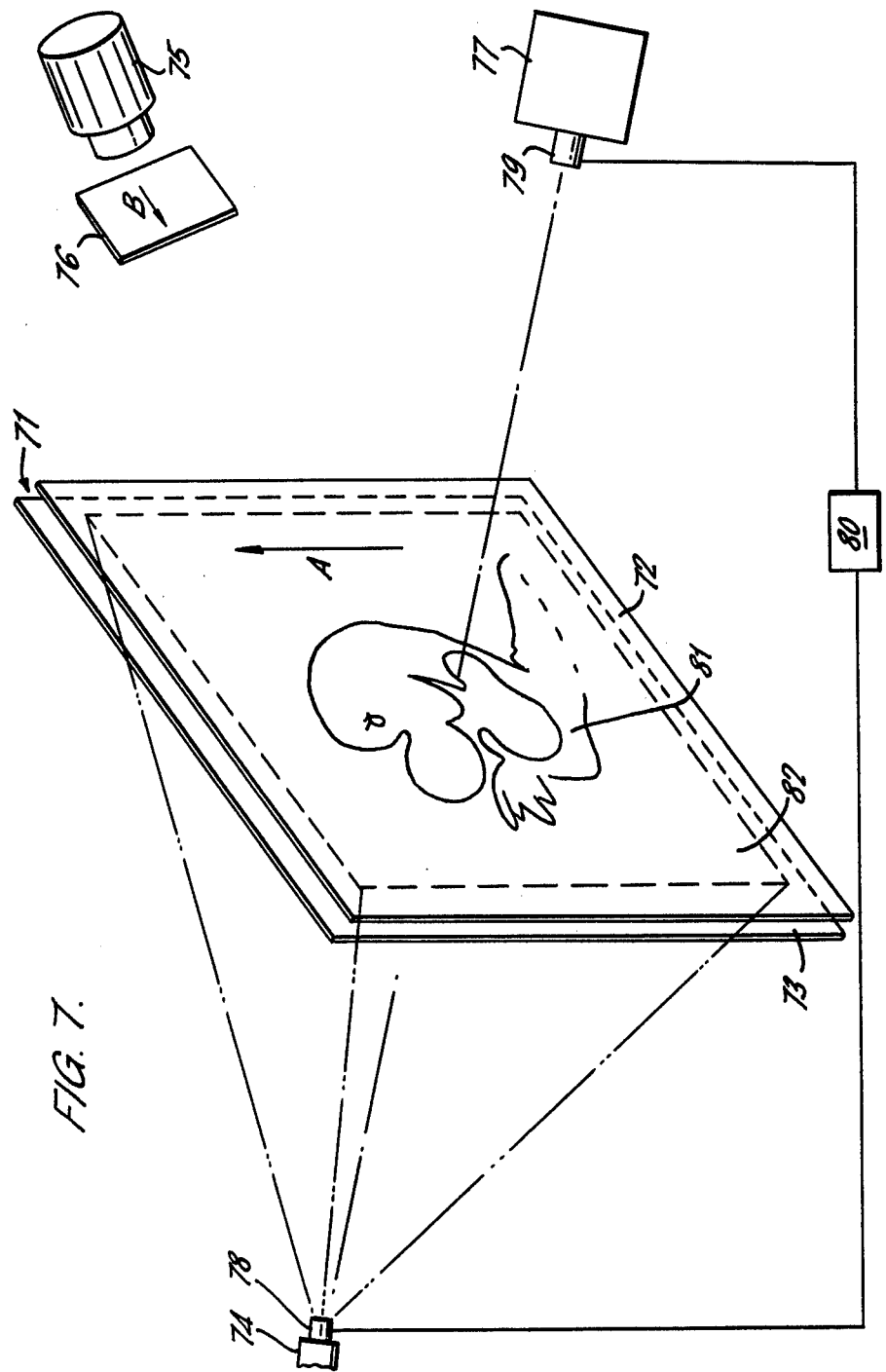

OPTICAL METHOD AND APPARATUS FOR CARRYING OUT THE METHOD

BRIEF DESCRIPTION OF THE PRIOR ART

At present, in filming, when imparting apparent movement in depth to a subject there are two main methods employed:

(i) is to actually have relative movement in depth between a front or back projected background, a subject and a viewer, e.g. a film camera, but in this case there has to be actual physical separation between the background and the subject so that one gets larger or smaller relative to the other, depending on the relative movement between the two and this causes problems with focussing both the background and the subject as they separate; and (ii) is to use a colour separation (or tone separation) method whereby the picture of the subject is taken against a flat coloured background to produce a matt and a counter-matt which are then used to insert the subject into a prefilmed background.

Both methods are unnecessarily complicated and time consuming. It is therefore an object of the present invention to provide an improved optical method of providing relative movement in depth between a subject and a background.

SUMMARY OF THE PRESENT INVENTION

According to the present invention a method of providing apparent relative movement in depth between a subject and a background comprises projecting a background onto a reflective surface, placing a subject to which movement is to be imparted in the optical path between the background and a viewer, and providing the viewer with a zoom capability synchronised with zoom conditions imparted to the background such that on the background zooming the viewer zooms to the same degree so that there is no apparent alteration in the background seen by the viewer whereas the subject which is only affected by the zoom capability of the viewer, appears to move relative in depth to the background.

The invention also includes apparatus for providing apparent relative movement in depth between a subject and a background comprising a projector for projecting the background, a viewer, means for imparting zoom conditions to the background, a zoom capability on the viewer and means for synchronising the zoom conditions of the background with the zoom of the viewer.

Preferably the apparatus of the invention includes a projection screen comprising a polarising sheet having on or adjacent one face a layer of translucent material. Therefore, according to a further feature of the invention, a photographic system includes a projection screen comprising a sheet of polarising material having a first direction of polarisation and provided on or adjacent one face with a layer of translucent material, a projector directed against that face of the projection screen having the layer of translucent material for producing a background image on the screen, a light source directed against the other face of the projection screen, a plate of polarising material having a direction of polarisation transverse to that of the screen and disposed in the optical path between the light source and the screen, a viewer having a zoom mechanism, means for imparting zoom conditions to the background and means for synchronising the zoom conditions of the background with the zoom of the viewer.

In this specification it is understood that the term "viewer" is intended to include a camera as well as a viewing device into which a person actually looks. Also, instead of being an ordinary projected image and viewer, the projection may be stereoscopic as well as the viewer so that three dimensional movement in depth may be provided.

Although it is preferable to provide a separate projector and viewer each with its own zoom lens it is understood that one unit may be constructed to accommodate both projector and viewer whereby only one zoom lens would be required for the unit.

BRIEF DESCRIPTION OF THE DRAWINGS

The invention will now be described by way of example with reference to the accompanying drawings in which:

FIG. 2 is a side elevation of one form of zoom mechanism suitable for use with a camera or projector;

FIG. 4 is a diagrammatic plan view of an alternative embodiment of apparatus for carrying out the method of the invention;

FIG. 7 is a diagrammatic view of a third embodiment.

DESCRIPTION OF THE PREFERRED EMBODIMENTS

Figure 1:
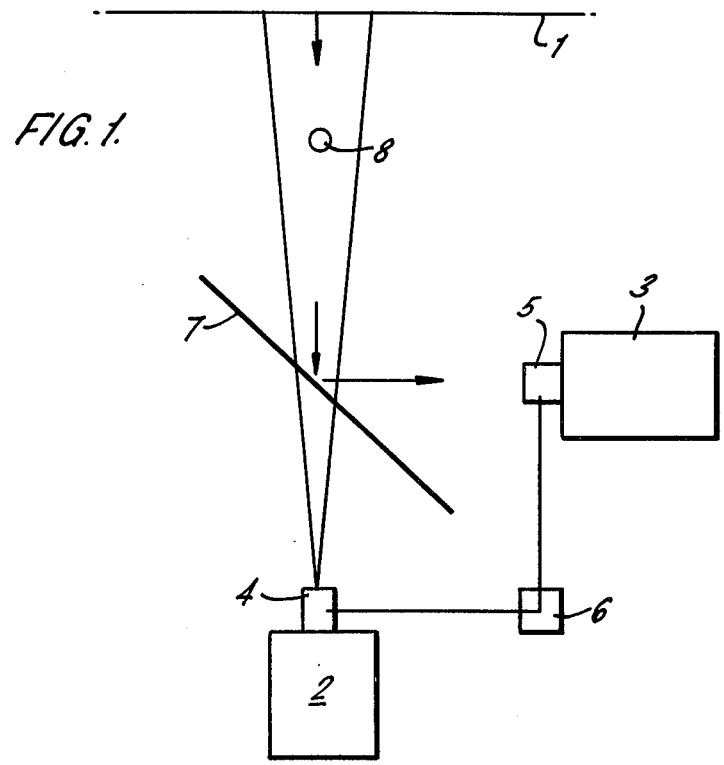
FIG. 1 is a diagrammatic plan view of one embodiment of an apparatus for carrying out the method of the invention.

In the embodiment of FIG. 1 of the drawings an optical system comprises a front projection screen 1, a projector 2 and a camera 3. The projector 2 and camera 3 are each provided with a zoom mechanism numbered 4 and 5 respectively, which are synchronised together electrically by control 6; each camera is provided with zoom lenses of exactly the same type. Located intermediate the projector 2 and screen 1 is an optical gate 7 in the form of a two-way mirror which allows a proportion of light to pass and reflects the remaining light. A subject to which apparent movement in depth is to be imparted is indicated as 8 intermediate the two-way mirror 7 and the front projection screen material 1.

The zoom mechanisms 4 and 5 are of substantially the same construction and the details of the zoom mechanism 4 to be used on the projector 2 are illustrated in FIG. 2. The only difference between the zoom mechanism 4 and the zoom mechanism 5 is that no iris compensation is needed on the zoom mechanism 5 of the camera 3.

The zoom mechanism 4 has a conventional shell 10 which may enclose any suitable combination of zoom lenses; for example a suitable shell and lens system is the CINE VAROTAL 10 × 25 T/4 manufactured by RANK OPTICS. As the disposition of lenses and the specific construction within the shell 10 form no part of this invention and as the details are known per se no further description of the zoom lens mechanism will be given here.

In the present invention the movement of the zoom mechanism to permit zooming in and zooming out on a subject is effected by rotation of a gear wheel 11 part of which is exposed through an arcuate slot 12 in the rear of the shell 10. The rotation of the gear wheel 11 is controlled by a slave Selsyn motor 13 mounted on a bracket 14 in turn mounted on the shell 10 by bolts 15 (only one of which is shown). The rotor 16 of the Selsyn motor 13 is connected through a coupling 17 to a shaft 18 of a reduction gear box 19: suitably the reduction is 25.1. The gear box 19 includes several gears (not shown) with the final drive through a gear wheel 20 which meshes with the gear wheel 11. The gear wheel 20 is mounted on a rotatable shaft 21 which is extended outside the casing of the gear box 19. One end of the shaft 21 carries a pulley wheel 22 and the other end, the forward end, is in the form of a worm drive screw 23. The worm drive screw 23 carries a movable block 24 which forms one half of a trip switch 25 in the electrical circuit to the Selsyn motor 13. Alternatively, the control of movement may be by a slip clutch mechanism on the gear box 19.

The pulley wheel 22 is vertically aligned with a pulley 26 and a belt 27 passes about both pulleys. The pulley 26 is secured to the iris ring 28 of the zoom mechanism 4 which alters the amount of light entering the projector 2. The zoom mechanism 4 is releasably secured to the projector 2 by a standard coupling 29. The coupling 29 has internal screw threads (not shown) which engage external screw threads 30 on the zoom mechanism 4 and inwardly directed arcuate lugs (not shown) which form a bayonet engagement with outwardly directed arcuate lugs 31 on the projector 2.

Figure 3:
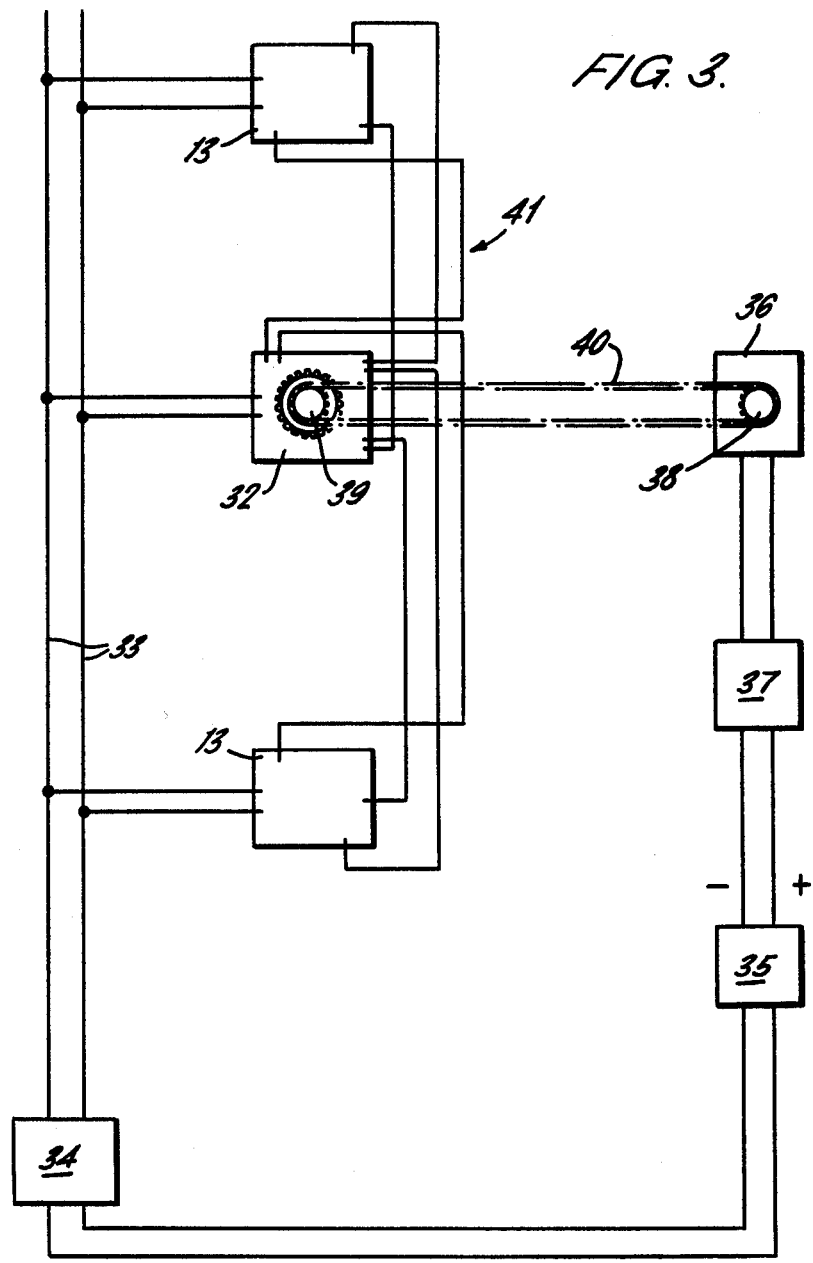
FIG. 3 is a diagrammatic view of the electrical control system.

The zoom mechanism 5 of the camera 3 has a similar motor drive as shown in FIG. 2, the movement of the slave Selsyn motors being determined by a master Selsyn motor 32 (see FIG. 3). Selsyn motors are a special type of A.C. motor having a three-phase stator winding with single phase winding on the rotor. Selsyn motors are such that when the connected Selsyn motors are in the same position relative to each other, the electromotive forces induced in the stator winding oppose one another and no stator current flows. However, any relative displacement will upset this balance and cause circulating currents in the stator circuits which cause torques restoring the units to corresponding positions. Thus, by effecting movement of one Selsyn motor, the master motor 32, the slave Selsyn motors 13 must make a corresponding movement to restore the balance in the stator circuits.

Referring to FIG. 3, which is a diagrammatic view of the electrical control circuit (excluding the trip switches 25), reference 33 indicates the single phase A.C. supply for the rotors of the Selsyn motors 13 and 32. The supply has been converted from 240 volts A.C. single phase supply to 110 volts A.C. single phase supply by a transformer 34. Also taken from the mains supply is alternating current which is converted to 24 volts D.C. by a D.C. transformer 35. The D.C. transformer supplies D.C. current to a master D.C. motor 36, the speed of which is governed by a rheostat 37. The D.C. armature of the motor 36 has a gear wheel 38 secured to its free end and is connected to a gear wheel 39 on the rotor of the master Selsyn motor 32 by a gear train 40 which passes around gears 38 and 39. The gear ratio is preferably such as to give a 20 to 1 reduction between the master D.C. motor 36 and the master Selsyn motor 32. The stator windings of the slave Selsyn motors 13 are three-phase and are interconnected with the stator windings of the master Selsyn motor 32 as generally indicated by reference 41.

FIG. 4 illustrates an alternative embodiment of an apparatus for carrying out the invention where, instead of front projecting a background as in FIG. 1, the background is back projected. In addition, and as shown, the back projection may be by a video projector which will show an immediate display from a video source. A suitable projector of this type is the 'Telebeam 11' manufactured by Kalart Victor Corporation of Conn., U.S.A.

In FIG. 4 the video source is a T.V. camera 42 which has a zoom mechanism 43 similar to that shown in FIG. 2. The zoom mechanism 43 is connected, via a control box 84, with a zoom mechanism 44 on a camera 45 to be synchronised therewith. The T.V. camera 42 is filming subject 46 against a background 47, this filmed sequence is then simultaneously back-projected onto a screen 48 by the video projector 49 which is in communication with the T.V. camera 42. Located between the camera 45 and the screen 48 is the subject 50 to whom is to be imparted apparent movement in depth. The dotted and dot-dash lines 51 and 52 respectively indicate the zoom in and out of the respective cameras: the projector 49 projects a picture of the same size throughout.

Figure 5:
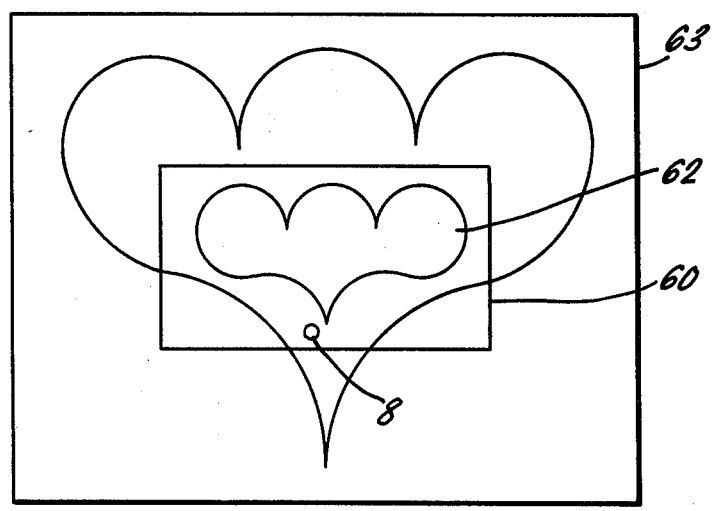
FIG. 5 is a front elevation of a screen showing a background before and after zoom.

In operation of the first embodiment and referring particularly to FIG. 5, a background is projected as indicated by the line 60 and the subject 8 is seen to be outside the projected image 62. However, on zooming the projected background to an enlarged size as indicated by the line 63 the subject 8, which has remained in the same place, is now embraced by the projected image. The camera 3, which has a zoom synchronised with the zoom of the projector, zooms to exactly the same degree except that this time the subject is affected by the zoom of the camera and is reduced in size relative to the projected image. The camera therefore, picks up apparent movement in depth and lateral movement of the subject since the subject has moved from outside to inside the projected image and away from the camera or viewer.

Figure 6A:
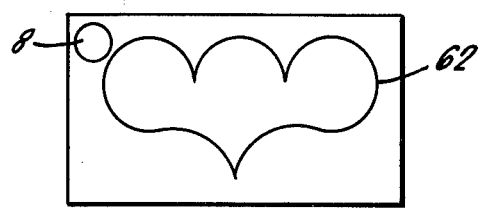
FIGS. 6a and 6b illustrate a projected image as seen from the viewer before and after zoom respectively.
Figure 6B:
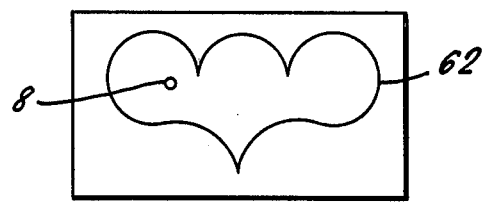
Figure 6C:
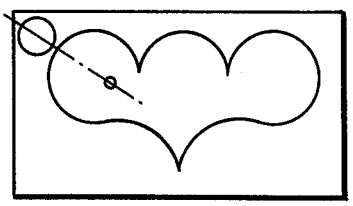
FIG. 6c illustrates the path of movement.

FIGS. 6a, 6b and 6c clearly illustrate the effect of the zooming upon the subject 8 as seen by the camera. In FIG. 6a the projected image 62 is actually proportionally about four times smaller than the projected image in FIG. 6b but because of the zoom synchronisation between the projector and the camera the projected image 62 appears to remain the same size whereas the subject 8 has reduced in size imparting relative movement in depth between the subject 8 and the background. The depth of movement therefore is controlled by the zoom synchronisation but if however lateral movement is also required this is controlled by the relationship between the subject 8 and the lens centre of the projector and camera. For example, if the subject 8 were located in exactly the centre of the background no apparent lateral movement would be achieved on zooming but merely movement in depth. However, if the subject is away from the centre as shown in FIGS. 6a and 6b then lateral movement is achieved, in this instance in a path as illustrated by FIG. 6c. As lateral movement therefore is dependent upon the relationship between the subject and the lens centres synchronised panning of the projector and camera during zooming will produce lateral movement in any desired path as well as in depth.

In the second embodiment of FIG. 4 the effect of lateral movement and movement in depth is the same as described with reference to the first embodiment above but the zoom synchronisation is between the T.V. camera filming the background to be projected and the camera filming the completed subject. The main advantage of the second embodiment is that although the filming by the T.V. camera and the projection are remote from one another the operations can be carried out in the same studio enabling mating up for voices, etc. at the same time.

In the filming of a subject before a screen of the first two embodiments there can be a lighting problem of the subject. In the case of a back-projected image it has previously been necessary for the subject; e.g. an actor, to stand a sufficient distance from the screen so that light directed onto the actor does not spill onto the screen and wash-out the back-projected image. In FIG. 7, which shows a third embodiment, a photographic system has a projection screen 71 consisting of a sheet of polarising material 72 having a direction of polarisation according to arrow A and a layer of translucent material 73 is disposed over the back of the screen 71 and either consists of a standard back-projection screen as shown or a layer of translucent material sprayed onto the back face of the sheet of polarising material 72.

Directed against the back of the projection screen 71 is a projector 74 for back-projecting a slide or cinematographic image onto the screen. In the front of the projection screen 71 there is a light source 75 for illuminating an actor or image being filmed and a plate 76 of polarising material having a direction of polarisation according to arrow B in a direction substantially at right angles to the direction of arrow A. A camera 77 is also shown in front of the screen 71 for recording the scene. The projector 74 and camera 77 each have a zoom mechanism 78, 79 synchoronised through control box 80.

In use in animation as shown an opaque subject 81 is painted on a transparent acetate cell 82 and located in front of screen 71. The subject 81 is then illuminated by the light source 75 and a suitable background image back-projected onto the screen 71. Because of the polarising properties of the screen 71 and the plate 76 the light from the light source 75 is able to light the subject 81 but is absorbed by the screen 71 thus preventing the back-projected image from being washed-out. Synchronised moving of the zooms 78, 79 produces movement in depth as shown in FIGS. 6a, 6b and 6c.

The polarising material of the screen 71 and plate 76 preferably comprises dichroic crystals and may be dichroic crystals of Iodoquinine sulfate in parallel orientation.

The present invention may be used with projected photographic film or still transparencies or any other suitable background. In the case of the embodiment of FIG. 4 the filming of the T.V. camera 42 and the camera 45 may be carried out at different times, the synchronisation being controlled by a predetermined taped programme or other programme adapted to drive the zoom mechanisms to a predetermined pattern.

Although the present invention has been particularly designed for use in professional film making the invention may be used as a head-up display system for flight simulation and also, although reference has been made to electrical synchronisation, mechanical synchronisation may be used.

As an alternative arrangement to the preferred embodiments disclosed the same effect of apparent movement in depth may be produced by moving the camera and projector together by synchronised tracking. In this way, as the size of the projected background increases or decreases, so does the size of the picture being filmed by the camera so that no apparent alteration in the size of the background takes place. The main problem with actual movement of the camera and projector is maintaining focus but this could be achieved by an automatic follow focus system on both the camera and projector. Similar to the embodiment of FIG. 4, if desired, the background may be imparted apparent size change by actual movement of the background-filming camera, the background then being projected by a video projector. In this case, the background filming camera and the final filming camera would have synchronised tracking.

I claim:

1. A method of providing apparent relative movement in depth between a subject and a background comprising projecting a background onto a reflective surface, placing a subject to which movement is to be imparted in the optical path between the background and a viewer, and providing the viewer with a zoom capability synchronised with zoom conditions imparted to the background such that on the background zooming the viewer zooms to the same degree so that there is no apparent alteration in the background seen by the viewer whereas the subject which is only affected by the zoom capability of the viewer, appears to move relative in depth to the background.

2. A method according to claim 1 comprising front projecting the background onto a projection screen.

3. A method according to claim 1 comprising placing the subject on the reflective surface.

4. A method according to claim 1, comprising imparting zoom conditions to the projected background by providing the projector with a zoom capability synchronised to the zoom capability of the viewer.

5. A method according to claim 1, comprising imparting zoom conditions to the projected background prior to projection.

6. Apparatus for providing apparent relative movement in depth between a subject and a background comprising a projector for projecting the background, a viewer, means for imparting zoom conditions to the background, a zoom capability on the viewer and means for synchronising the zoom conditions of the background with the zoom of the viewer.

7. Apparatus according to claim 6, wherein the viewer is a camera.

8. Apparatus according to claim 7, wherein the means for imparting zoom conditions to the background is a zoom mechanism on the projector.

9. Apparatus according to claim 7, wherein the means for imparting zoom conditions to the background comprises a zoom mechanism on a T.V. camera filming the background which is simultaneously projected by a video projector, the zoom mechanism on the T.V. camera and on the viewer being electrically sychronised.

10. Apparatus according to claim 7, wherein the means for imparting zoom conditions to the background is a zoom mechanism on the projector, the zoom mechanism on the projector and the zoom mechanism on the camera being electrically synchronised by a master Selsyn motor interconnected with a slave Selsyn motor on each zoom mechanism.

11. Apparatus according to claim 6 further including a projection screen comprising a polarising sheet having on or adjacent one face a layer of translucent material.

12. Apparatus according to claim 11, wherein the translucent material is a translucent coating sprayed onto one face of the polarising sheet.

13. A method according to claim 11, wherein the background is imparted actual size change by movement of the projector relative to the reflective surface and wherein corresponding size adjustment of the viewer is effected by movement of the viewer relative to the background, the movement of the projector and the viewer being synchronised.

14. A method according to claim 11, wherein the background is imparted apparent size change prior to projection by relative movement of a camera filming the background, the movement of the background-filming camera and the viewer being synchronised.

15. A method according to claim 11, wherein the synchronised size adjustment is effected by providing the viewer with a zoom capability synchronised with zoom conditions imparted to the background such that on the background zooming the viewer zooms to the same degree.

16. A photographic system including a projection screen comprising a sheet of polarising material having a first direction of polarisation and provided on or adjacent one face with a layer of translucent material, a projector directed against that face of the projection screen having the layer of translucent material for producing a background image on the screen, a light source directed against the other face of the projection screen, a plate of polarising material having a direction of polarisation transverse to that of the screen and disposed in the optical path between the light source and the screen, a camera having a zoom mechanism, means for imparting zoom conditions to the background and means for synchronising the zoom conditions of the background with the zoom of the camera.

17. A method of providing apparent relative movement in depth between a subject and a background comprising projecting a background onto a reflective surface, placing a subject to which movement is to be imparted in the optical path between the background and a viewer, synchronising the size of picture seen by the viewer with size conditions imparted to the background such that on the background being imparted an actual or apparent increase or decrease in size the viewer is synchronised to make a corresponding adjustment so that no apparent alteration in the background is seen by the viewer whereas the subject, which is only affected by the adjustment of the viewer, appears to move relative in depth to the background.

* * * * *

UNITED STATES PATENT AND TRADEMARK OFFICE
CERTIFICATE OF CORRECTION

PATENT NO. : 4,100,572
DATED : July 11, 1978
INVENTOR(S) : Zoran Perisic

It is certified that error appears in the above-identified patent and that said Letters Patent is hereby corrected as shown below:

Column 7, lines 7, 14 and 19, "claim 11" should read — claim 17 —.

Signed and Sealed this

Seventh Day of August 1984

[SEAL]

*Attest:*

*Attesting Officer*

GERALD J. MOSSINGHOFF

*Commissioner of Patents and Trademarks*